United States Patent [19]

Misawa et al.

[11] 4,196,898

[45] Apr. 8, 1980

[54] SHEET FEED APPARATUS FOR FACSIMILE SYSTEM

[75] Inventors: Toshihiko Misawa; Takaji Sue; Thutomu Kanai, all of Tokyo, Japan

[73] Assignee: Ricoh Company, Ltd., Tokyo, Japan

[21] Appl. No.: 698,455

[22] Filed: Jun. 21, 1976

[30] Foreign Application Priority Data

Jun. 24, 1975 [JP] Japan ................................. 50/78912

[51] Int. Cl.² ........................... B65H 1/26; B65H 7/04
[52] U.S. Cl. .......................................... 271/9; 271/118; 271/164; 271/258
[58] Field of Search .................. 271/9, 127, 34, 118, 271/258, 124, 164

[56] References Cited

U.S. PATENT DOCUMENTS

| | | | |
|---|---|---|---|
| 2,224,886 | 12/1940 | Tyler | 271/34 X |
| 3,265,384 | 8/1966 | Shute | 271/118 X |
| 3,273,883 | 9/1966 | Baronnie | 271/9 |
| 3,599,966 | 8/1971 | Del Vecchio et al. | 271/9 |
| 3,689,064 | 9/1972 | Kuksa | 271/127 X |
| 3,907,283 | 9/1975 | Miller | 271/258 |
| 4,061,328 | 12/1977 | Fujimoto et al. | 271/9 X |

FOREIGN PATENT DOCUMENTS

2422325  11/1974  Fed. Rep. of Germany ............. 271/9

*Primary Examiner*—Bruce H. Stoner, Jr.
*Attorney, Agent, or Firm*—Frank J. Jordan

[57] ABSTRACT

Two sheet trays are provided, one of which is fixed in position and carries copy sheets and the other of which is movable and carries original documents for transmission. The movable sheet tray is slidable over the fixed sheet tray between a retracted position and a sheet feed position. The trays are rockable in such a manner that a feed roller engages with the fixed sheet tray when the movable sheet tray is in the retracted position and with the movable sheet tray when the movable sheet tray is in the sheet feed position to feed copy sheets or original documents respectively. Movement of the movable sheet tray by the apparatus operator to the selected one of the retracted position and the sheet feed position automatically sets a facsimile transmission system in which the apparatus is incorporated to a receive mode or a transit mode respectively. A sensor is provided to the movable sheet tray to sense for the presence of original documents therein and automatically terminate multiple document transmission.

13 Claims, 20 Drawing Figures

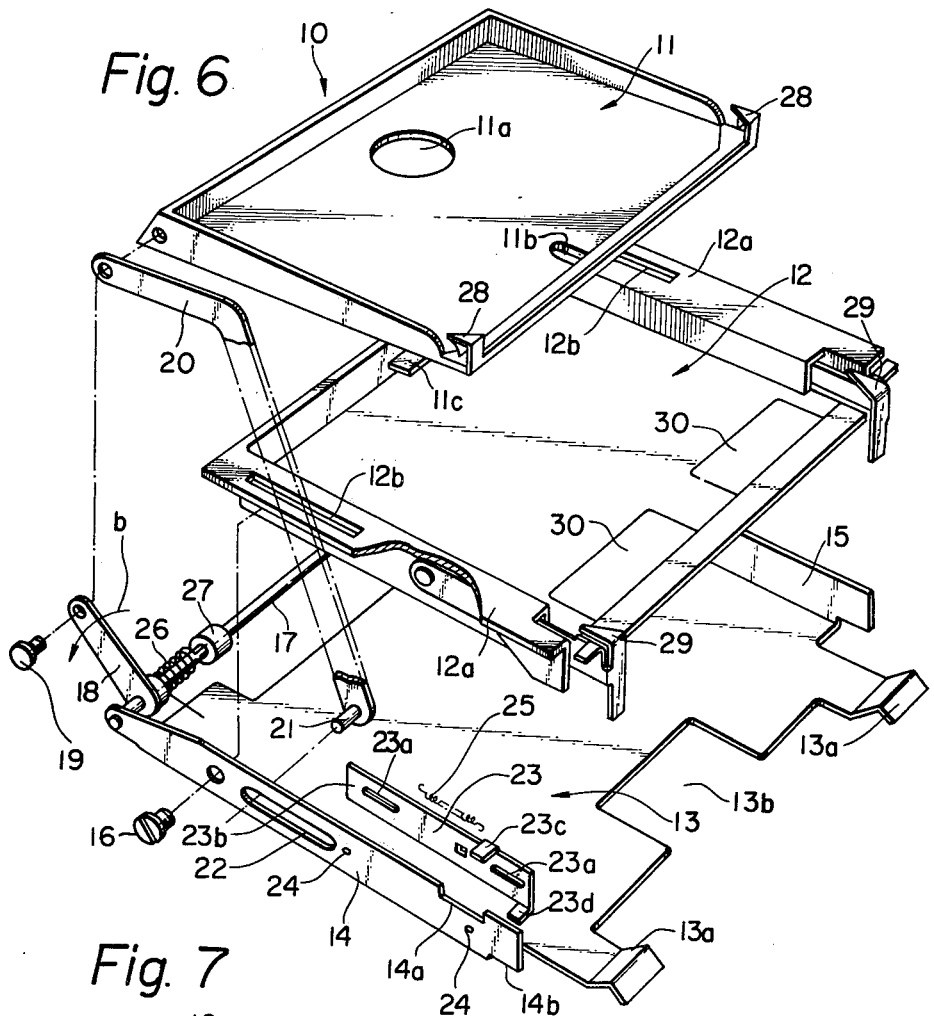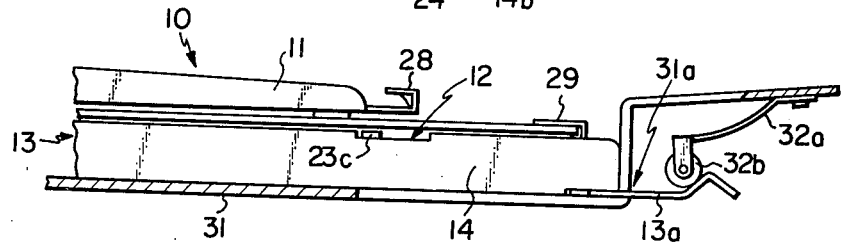

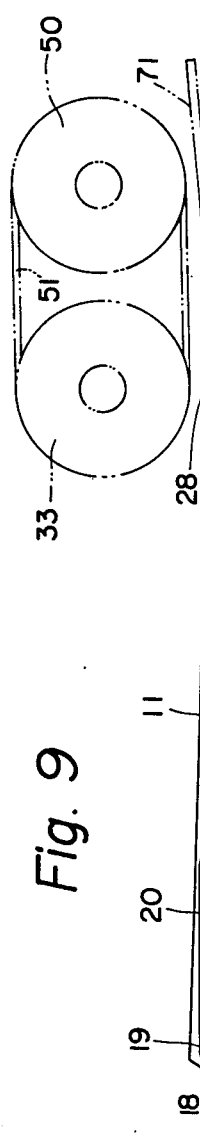
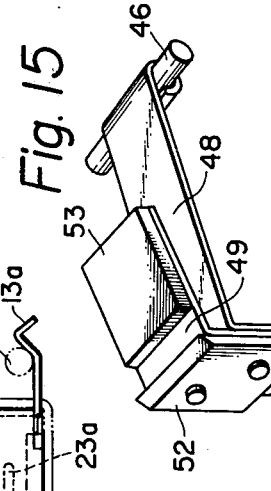
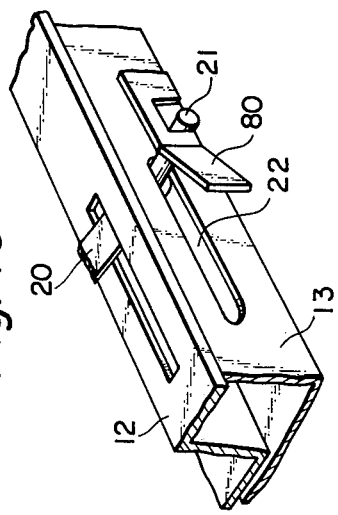
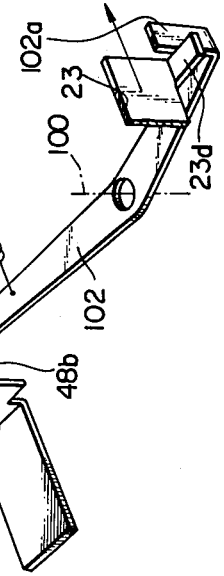

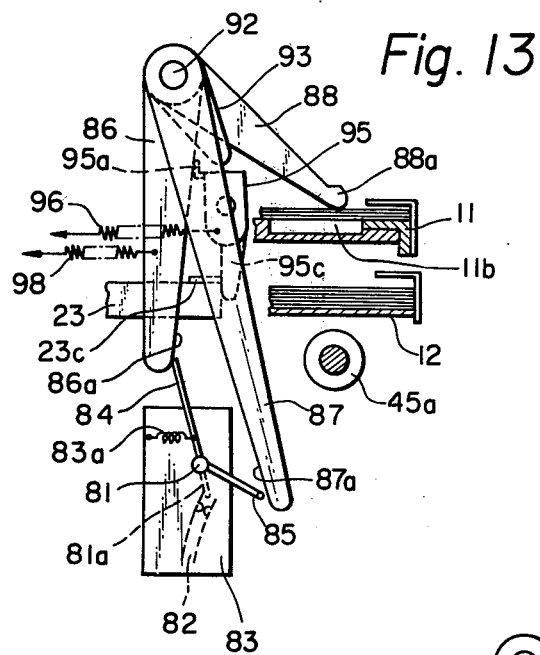
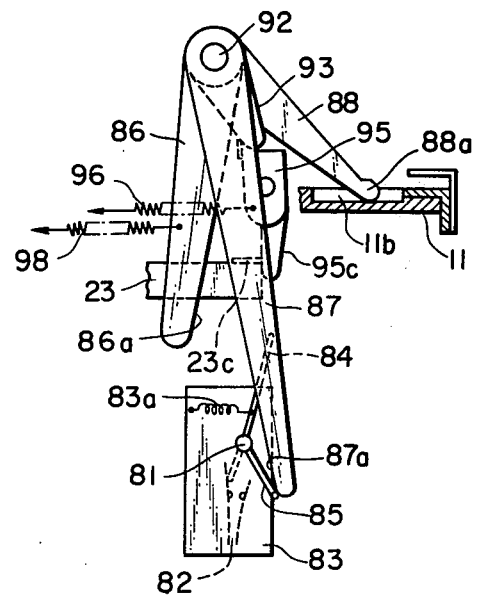

TRANSMIT MODE LOGIC

SHEET FEED APPARATUS FOR FACSIMILE SYSTEM

BACKGROUND OF THE INVENTION

The present invention relates to a sheet feed system for a facsimile transmission system, electrostatic copying machine or the like.

In electrostatic copying machines a cassette system has been introduced to facilitate the use of copy sheets of different sizes. In such a system, different sized copy sheets are provided in respective cassettes which are selectively inserted into the copying machine as desired. This cassette system provides faster changing of paper sizes than in the conventional system in which stacks of paper must be changed, guides adjusted, etc.

In order to further increase the speed of changing paper sizes, copying machines have been proposed in which two cassettes may be inserted in the copying machine and the desired cassette selected by means of a lever or switch. Although such a system provides a speed-up in copy sheet changeover, two feed systems for the respective cassettes are provided which increases the cost and complexity of the machine.

In an attempt to simplify such a system, a combination cassette has been proposed in which a single feed system is utilized for two copy sheet cassettes. In addition to the complex construction of this prior art combination cassette, a disadvantage is found in that it is difficult to load a fresh supply of copy sheets into the lower cassette.

Similar problems are found in facsimile transceivers which are used to reproduce documents by means of electrical signals transmitted over telephone lines or by wireless. Generally, a drum is provided on which an original document is wrapped for scanning and on which a copy sheet is wrapped for reproduction of a transmitted document. Recently, automatic feed mechanisms have been introduced to automatically feed either documents or copy sheets onto the drum. This enables automatic continuous transmission and reception and also unattended reception. Most of these systems have separate feed mechanisms for the documents and copy sheets, which increases the cost of the systems.

In such facsimile systems, mode switches are generally provided on the control consoles to switch between single document transmission, multiple document transmission and reception modes. An end switch is also provided which must be depressed at the termination of multiple document transmission. These switches increase the complexity of operation and thereby invite erroneous operation by persons such as office workers who have no understanding of electronic systems. It is also possible for a skilled person to accidently actuate the wrong switch and cause erroneous operation. It is particularly desirable to avoid mistakes in operation in the case of overseas facsimile transmission over telephone lines due to the high telephone charges.

SUMMARY OF THE INVENTION

It is therefore an object of the present invention to provide a sheet feed apparatus which allows sheets from two different cassettes to be selectively fed by a single feed mechanism and also allows the sheets in the bottom cassette to be easily replaced.

It is another object of the invention to provide a sheet feed apparatus in which selection of one of two cassettes is made simply by sliding one of the cassettes between a retracted position and a sheet feed position.

It is another object of the invention to provide a sheet feed apparatus which comprises switch means for automatically setting a facsimile system or a copying machine in which the apparatus is incorporated to one of two modes.

It is another object of the invention to provide a sheet feed apparatus which automatically terminates the operation of an associated facsimile system when all of the original documents in a document tray have been scanned for reproduction.

It is another object of the invention to provide a sheet feed apparatus in which a facsimile transceiver is switched to either a transmit mode or a receive mode by moving either an original document tray or a copy sheet tray to a sheet feed position and the transceiver remains in a multiple transmit mode as long as there are documents in the document tray.

Other objects, together with the foregoing, are attained in the embodiment described in the following description and illustrated in the accompanying drawings.

BRIEF DESCRIPTION OF THE DRAWING

FIG. 6 is an exploded perspective view of a sheet feed cassette assembly of the invention;

FIG. 7 is a fragmentary plan view illustrating the attachment of the cassette assembly to a facsimile transceiver;

FIG. 9 is a fragmentary plan view similar to FIG. 8 showing the apparatus in a transmit mode;

FIG. 10 is a fragmentary perspective view showing a detail of the apparatus;

FIG. 13 is similar to FIG. 12 but shows the mode switch and linkage in a transmit mode in which documents are retained for scanning;

FIG. 14 is similar to FIG. 13 but shows the mode switch and linkage in a transmit mode in which the documents for scanning have all been fed;

FIG. 15 is a fragmentary exploded view of a separator mechanism and a latching means for the mechanism;

DESCRIPTION OF THE PREFERRED EMBODIMENTS

While the sheet feed apparatus of the invention is susceptible of numerous physical embodiments, depending on the environment and requirements of use, substantial numbers of the herein shown and described embodiment have been made, tested and used, and all have performed in an eminently satisfactory manner.

Figure 1:
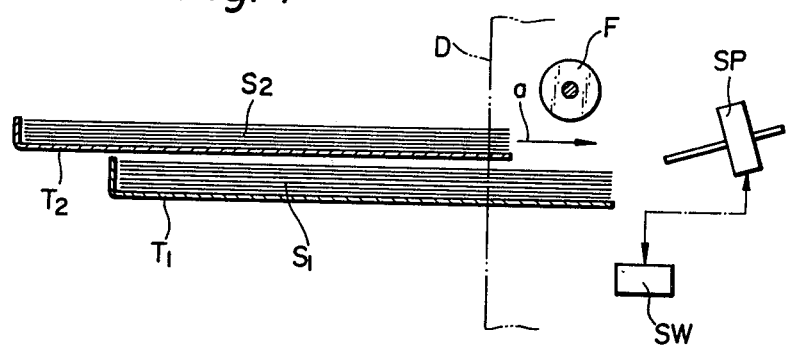
FIG. 1 is a schematic plan view illustrating a sheet feed apparatus embodying the present invention.

Referring now to FIG. 1, a sheet feed apparatus of the invention is schematically illustrated as comprising a first sheet tray T1 which retains first sheets S1. A second sheet tray T2 is slidable on the first sheet tray T1 from a retracted position as shown in the direction of an arrow a to a sheet feed position which will be described below and retains second sheets S2. For use with a facsimile transceiver, the first sheet tray T1 is adapted to retain copy sheets and the second sheet tray T2 is adapted to retain original documents which are to be transmitted in sequence. For use with a copying machine, the sheet trays T1 and T2 are adapted to retain copy sheets of different sizes. A feed roller F is disposed above the first sheet tray T1. In the most preferred embodiment of the invention the first sheet tray T1 is longitudinally fixed in position and the second sheet tray T2 is slidable thereon. The feed roller F is arranged to feed the sheets S1 and S2 from a selected one of the sheet trays T1 and T2 respectively.

Figure 2:
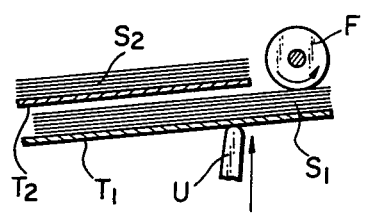
FIG. 2 is a fragmentary plan view showing a first sheet feed mode of the apparatus.

FIG. 2 illustrates a first mode of sheet feeding in which an actuator member U is utilized to rock the sheet trays T1 and T2 upwardly so that the roller F feedingly engages with the sheets S1 in the sheet tray T1. If the second sheet tray T2 is moved rightwardly in FIG. 1 into position below the feed roller F and the actuator member U is subsequently moved upwardly to rock the sheet trays T1 and T2 upwardly, the feed roller F will feedingly engage with the sheets S2 in the sheet tray T2 rather than with the sheets S1 in the sheet tray T1.

Figure 3:
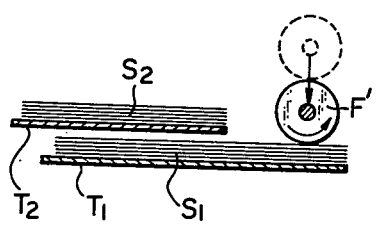
FIG. 3 is similar to FIG. 2 but shows a second sheet feed mode.

FIG. 3 shows an alternative mode of engaging a feed roller F′ with the sheets S1 and S2. In this method, the trays T1 and T2 are not rocked, but the feed roller F′ is moved downwardly from a phantom line position to a solid line position.

Figure 4:
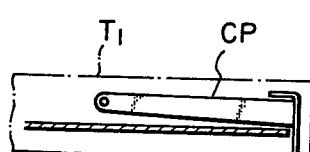
FIG. 4 is a schematic view of a first example of a sheet separating means.
Figure 5:
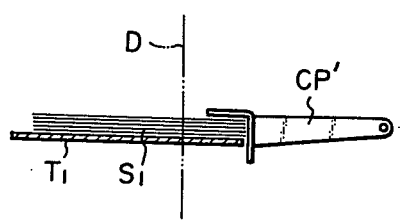
FIG. 5 is similar to FIG. 4 but shows a second example of sheet separating means.

As shown in FIG. 4, a corner separator CP which will be described in detail below may be provided to the tray T1. Alternatively, it may be mounted on a frame of a facsimile transceiver D as designated at CP′ in FIG. 5.

Sliding movement of the second sheet tray T2 is arranged to set a mode switch means SW. If the sheet feed apparatus is adapted to be used with a facsimile transceiver with original documents as the sheets S2 and copy sheets as the sheets S1, with the sheet tray T2 in its retracted position as shown in FIG. 1 the mode switch means SW is set to a receive mode. If the sheet tray T2 is moved rightwardly to its sheet feed position, it engages with the mode switch means SW to set it to a transmit mode. The sheet tray T2 is also arranged to render a secondary sheet separator SP inoperative when in its sheet feed position.

If the sheet feed apparatus is adapted to be used with a copying machine and the sheets S1 and S2 are copy sheets of different sizes, the mode switch means SW is set to indicate to the copying machine the size of copy sheets selected. It will be understood that the operating mode in the case of a facsimile transceiver or the sheet size in the case of a copying machine is selected by the system operator by moving the second sheet tray T2 to the selected one of its retracted and sheet feed positions.

Referring now to FIG. 6, a cassette assembly 10 is of the type shown in FIGS. 2 and 4 and is adapted for use with a facsimile transceiver which will be described below. A copy sheet tray 12 is rockably mounted on a frame 13 by means of two screws 16 (only one is visible). A shaft 17 is rotatably mounted between side plates 14 and 15 of the frame 13 and two guide arms 18 (only one is visible) are fixed to the shaft 17 for unitary rotation. A document tray 11 adapted to retain documents for facsimile transmission is pivoted to the guide arms 18 by means of respective screws 19 (only one is visible). The copy sheet tray 12 is provided with wings 12a and the document tray 11 is provided with projections 11c (only one is visible) which slide on the wings 12a. The document tray 11 is formed with a peep hole 11a to facilitate determining whether there are any copy sheets in the copy sheet tray 12 and a sensor hole 11b through which a sensor arm which will be described below is adapted to protrude. Corner separators 28 are provided at the corners of the document tray 11 to ensure that only one document will be fed at one time from the tray 11. The copy sheet tray 12 is similarly provided with corner separators 29 in addition to rubber friction members 30.

Two bent links 20 (only one is visible) are pivoted to the guide arms 18 by the screws 19 respectively and extend through holes 12b formed through the wings 12a. Pins 21 are fixed to the lower ends of the links 20 which slidingly engage in slots 22 formed in the side plates 14 and 15 respectively. Two sliding links 23 (only one is visible) are slidingly mounted to the side plates 14 and 15 by means of two pins 24 engaging in respective slots 23a in the links 23. Tabs 23c and 23d extending from the link 23 engage in cutouts 14a and 14b in the side plate 14 to limit the movement of the link 23. A tension spring 25 is provided between the link 23 and the leftmost pin 24 (as viewed in FIG. 6) to urge the link 23 leftwardly. The pin 21 is engagable with the link 23 at a left end 23b thereof to move the link 23 rightwardly against the force of the spring 25 as will be described below.

A collar 27 is rotatably mounted on the shaft 17 but held against rotation by a fixed member (not shown). A torsion spring 26 is fixed at one end to the guide arm 18 and at the other end to the collar 27 to urge the guide arm 18 counterclockwise as shown by an arrow b. The frame 13 is provided with a cutout 13b through which an actuator member which will be described below is adapted to protrude and positioning tabs 13a.

As shown in FIG. 7, the frame 13 of the cassette 10 is arranged to be supported by a fixed plate 31 of a facsimile transceiver, and the tabs 13a are arranged to protrude through openings 31a in an upstanding portion of the plate 31. Rollers 32b are urged to retainingly engage with the tabs 13a by means of sheet springs 32a to mount the cassette 10 to the facsimile transceiver.

Figure 8:
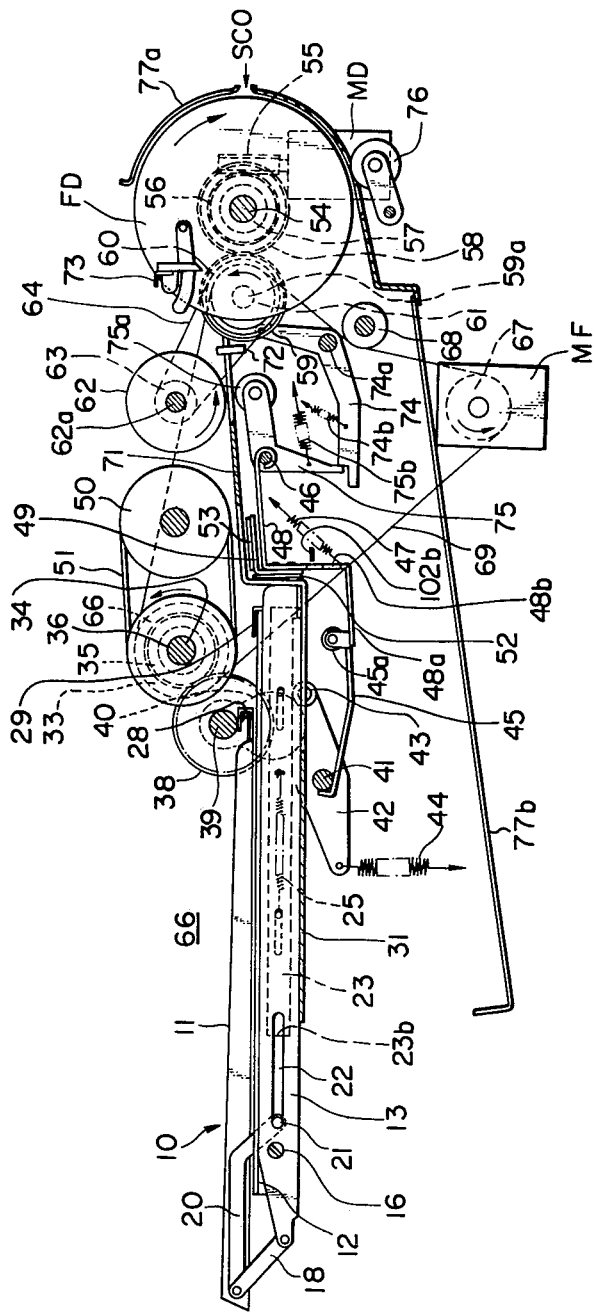
FIG. 8 is a plan view of a sheet feed apparatus of the present invention in operation association with a facsimile transceiver with the apparatus being in a receive mode.

Referring now to FIG. 8, a sheet feed belt 51 is trained around a sheet feed roller 33 which corresponds to the roller F of FIG. 1 and an idler roller 50, with the rollers 33 and 50 and belt 51 being rotatable counterclockwise to feed sheets toward a facsimile drum FD. In the retracted position of the document tray 11 shown in FIG. 8, the feed roller 33 is positioned above the right edge portion of the copy sheet tray 12 so that the feed roller 33 and belt 51 will feed sheets from the copy sheet tray 12 when the trays 11 and 12 are rocked upwardly. FIG. 9 shows the document tray 11 in its sheet feed position in which the document tray 11 is slid rightwardly over the copy sheet tray 12 until the right edge portion of the document tray 11 is positioned above the right edge portion of the copy sheet tray 12 and below the feed roller 33. In the sheet feed position of FIG. 9 the feed roller 33 and belt 51 will feed sheets from the document tray 11 rather than from the copy sheet tray 12 when the trays 11 and 12 are rocked upwardly.

Referring again to FIG. 8, the mechanism for rocking the trays 11 and 12 upwardly comprises a shaft 34 supporting the feed roller 33 for unitary rotation and a gear 35 mounted on the shaft 34 through a spring clutch 36. The gear 35 meshes with a gear 38 supported for unitary rotation with a shaft 39. A cam 40 is also fixed to the shaft 39. A cam lever 42 is fixed to a shaft 41 which is supported for rotation by a fixed member (not shown). A tension spring 44 urges the cam lever 42 counterclockwise so that a roller 43 mounted on the right end of the cam lever 42 engages with the cam surface of the cam 40. An arm 45 is fixed to the shaft 41 for unitary rotation and carries at its end a roller 45a. When the spring clutch 36 is actuated, the cam 40 is rotated clockwise so that the cam lever 42 and arm 45 are rotated counterclockwise by the spring 44 and the roller 45a protrudes through the cutout 13b and engages with the copy sheet tray 12 to rock the sheet trays 11 and 12 counterclockwise about the screws 16. This causes the feed roller 33 and belt 51 to engage with the right edge portion of the uppermost sheet in the copy sheet tray 12 if the document tray 11 is in the retracted position of FIG. 8 or with the uppermost sheet in the document tray 11 if the document tray 11 is in the sheet feed position of FIG. 9 to feed the sheet toward the facsimile drum FD. A sensing means (not shown) is provided to disengage the spring clutch 36 after the cam 40 has made one rotation and the roller 45a has returned to its original position as shown in FIG. 8. Referring to FIG. 10, a latch 80 is provided to lock the pin 21 and thereby the document tray 11 in the sheet feed position, and is releasable by the operator to return the document tray 11 to the retracted position. The document tray 11 may be automatically reset to the retracted position as will be mentioned below.

The feed roller 33 is driven from a feed motor MF by means of a pulley 66 fixed thereto, a motor drive pulley 67 and a belt 69. The belt 69 is furthermore trained around an idler pulley 68 and a pulley 61 mounted for rotation with a shaft 59a.

An L-shaped separator arm 48 is pivotally supported by a shaft 46 and urged clockwise by a tension spring 47. The arm 48 has an end portion 48a which is constantly urged into abutment with the bottom end portion of the arm 45 by the spring 47. Referring also to FIG. 15, a bracket 49 is mounted on the arm 48 on which is mounted a separator pawl 52 and a separator friction member 53. When the arm 45 is rotated counterclockwise by means of rotation of the cam 40, the arm 48 is urged to rotate clockwise by the spring 47 so that the separator pawl 52 and friction member 53 protrude through a hole (no numeral) in a guide plate 71 to separate a topmost sheet fed by the roller 33 and belt 51 from any excess sheets adhering thereto. The separated sheet is fed into abutment with a retractable stop 72.

Referring again to FIG. 15, a locking means for the arm 48 comprises a locking lever 102 which is pivotal about an axis 100 and urged to rotate away from a cutout 48b in the arm 48 by a tension spring 101. When, however, the sliding link 23 is moved in the direction of an arrow in response to movement of the document tray 11 to the sheet feed position of FIG. 9, the tab 23d engages with a tab 102a of the lever 102 rotating the lever 102 against the force of the spring 101 so that an end 102b of the lever 102 engages in the cutout 48b of the arm 48. In this manner, the arm 48 is prevented from clockwise rotation in FIG. 8 when the cam 40 is rotated and the separator pawl 52 and friction member 53 are rendered inoperative. This feature is provided for a facsimile system in which the original documents are placed in protective plastic jackets in the document tray 11. The jackets (not shown) are formed of a piece of clear plastic which is folded in half, with the document placed between the halves. If the pawl 52 and friction member 53 were allowed to operate on such a document and jacket combination, the upper half of the jacket would be fed off the lower half and the document which would result in jamming of the apparatus and possible damage to the document and jacket. The locking lever 102 may be omitted if the documents are not provided in plastic jackets.

In FIG. 8, a feed roller 62 is fixed to a shaft 62a for unitary rotation. A pulley 63 is fixed to the shaft 62a in such a manner that the roller 62 is driven counterclockwise from the shaft 59a by means of a pulley 60 fixed to the shaft 59a and a belt 64 trained around the pulleys 60 and 63. A roller lever 75 is pivotally supported by the shaft 46 and is urged counterclockwise by a tension spring 75b. A roller 75a is carried at the upper end of the lever 75. The lever 75 is normally held in the position shown in FIG. 8 by a trigger lever 74 which is pivotal about a shaft 74a and urged clockwise by a tension spring 74b. A gear 59 is fixed to the shaft 59a and meshes with a gear 58 which is connected to a shaft 54 on which the drum FD is fixed for unitary rotation through a one-way clutch 57. A gripping pawl 73 is provided on the drum FD to clamp the leading edge of a sheet fed thereto to the drum FD.

The drum FD is driven clockwise at low speed through the gears 58 and 59 to feed a sheet thereonto. The sheet is fed from the selected one of the sheet trays 11 and 12 by the belt 51 into abutment with the stop 72. When the drum FD reaches a proper rotary position, actuator means (not shown) retract the stop 72 below the plate 71 and also actuate the trigger lever 74 to release the lever 75. The lever 75, thus released, rotates counterclockwise about the shaft 46 so that the roller 75a protrudes through a hole (no numeral) in the guide plate 71 to feedingly engage the sheet with the feed roller 62. The sheet is thereby fed by the rollers 62 and 75a into the bite of the gripping pawl 73 which is closed to clamp the sheet to the drum FD. The actuator means also reset the lever 75 after the sheet is completely wrapped around the drum FD.

A drum drive motor MD is provided to drive the shaft 54 and thereby the drum FD at a higher speed than the feed motor MF for a facsimile transmission operation. The motor MD is drivingly connected to the shaft 54 through a worm 55 and a worm gear 56 fixed to the shaft 54. The feed motor MF may either be de-energized or allowed to run due to the provision of the one-way clutch 57. A longitudinal opening SCO is provided in a guide 77a which is closely adjacent to the drum FD to facilitate the facsimile operation. If the operation is the transmit mode in which an original document from the document tray 11 is wrapped around the drum FD, an optical scanning element (not shown) is moved along the opening SCO in synchronism with the rotation of the drum FD to generate and transmit electrical signals representing the light and dark areas of the document. If the operation is the receive mode in which a copy sheet from the copy sheet tray 12 is wrapped around the drum FD, a stylus (not shown) is moved along the opening in contact with the copy sheet and in synchronism with the rotation of the drum FD to reproduce an original document at a remote location represented by received electrical signals.

After the facsimile operation is completed, a separator roller 76 is pressed against the sheet through a hole (no numeral) in the guide 77a and the gripping pawl 73 is opened to discharge the sheet from the drum FD into a receiving tray 77b.

Figure 11:
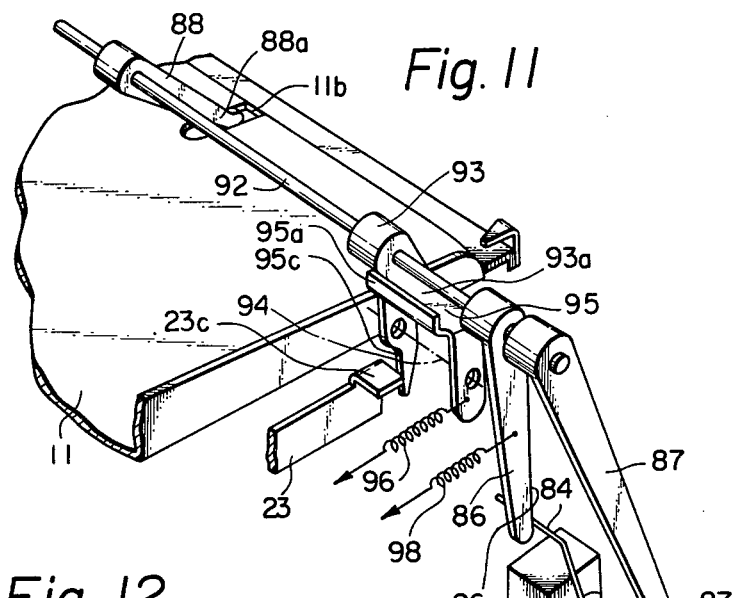
FIG. 11 is a perspective view showing a sheet sensor, mode switch and linkage of the apparatus.
Figure 12:
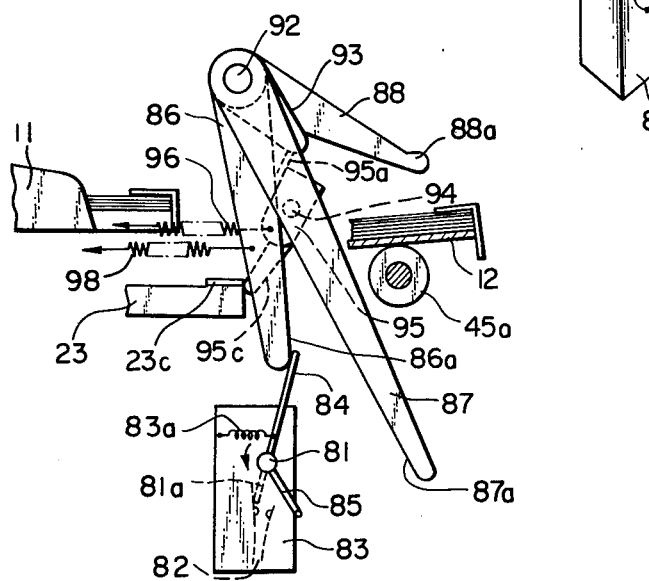
FIG. 12 is a plan view showing the mode switch and linkage in a receive mode.

FIG. 11 illustrates a sensor means to provide information to control the operation of the facsimile system in dependence on whether the document tray 11 is in the retracted position or the sheet feed position and whether or not there is at least one document in the document tray 11. A shaft 92 is rotatably supported by the apparatus and has a sensor arm 88 fixed thereto. The sensor arm 88 has an end portion 88a which is arranged to protrude into the sensor hole 11b in the document tray 11 when there are no sheets in the tray 11. A first switch arm 86 is fixed to the shaft 92 and is urged by a tension spring 98 clockwise as shown to urge the end portion 88a of the sensor arm 88 into the hole 11b. A second switch arm 87 is also fixed to the shaft 92 and angularly spaced from the first switch arm 86 in such a manner that edges 86a and 87a of the switch arms 86 and 87 respectively angularly face each other. A mode switch 83 is provided with an actuator shaft 81. First and second actuator arms 84 and 85 respectively are fixed to the shaft 81. As shown in FIG. 12, a tension spring 83a urges the arm 84 and thereby the shaft 81 counterclockwise.

A retractor arm 93 is also fixed to the shaft 92 and a channel latch lever 95 is pivotal about a shaft 94 and urged clockwise by a tension spring 96. The force of the spring 96 is selected to be stronger than that of the spring 98 so that in the free condition the latch lever 95 is rotated clockwise by the spring 96 so that an upper end portion 95a of the latch lever 95 engages with an end portion 93a of the retractor arm 93 causing the retractor arm 93, shaft 92 sensor arm 88 and switch arms 86 and 87 rotate counterclockwise to the position shown in FIG. 12.

In the position of FIG. 12, the document tray 11 is in the retracted position and the sensor arm 88 is held away from the trays 11 and 12 by the latch lever 95.

The mode switch 83 further comprises a switch actuator arm 81a which is fixed to the shaft 81 and arranged to open and close switch contacts 82. An open condition of the contacts 82 is designated as a first mode position and a closed condition of the contacts 82 is designated as a second mode position. When the document tray 11 in the retracted position, the arm 84 is urged against the switch arm 86 by the spring 83a and the contacts 82 are opened by the arm 81a.

Referring now to FIG. 13 the document tray 11 is moved to the sheet feed position and there are sheets in the tray 11. In this case, the tab 23c of the sliding link 23 is moved rightwardly and engages with a lower end portion 95c of the latch lever 95 thereby rotating the latch lever 95 counterclockwise. This movement allows the spring 98 to rotate the retractor arm 93, shaft 92, switch arms 86 and 87 and sensor arm 88 clockwise so that the end portion 88a of the sensor arm 88 engagingly abuts against the upper surface of the sheets in the document tray 11 which prevents the sensor arm 88 from protruding into the hole 11b. This clockwise rotation of the switch arms 86 and 87 allows the shaft 81 and arms 84 and 85 to rotate counterclockwise so that the arm 81a fixed to the shaft 81 allows the contacts 82 to close. The second mode position of the switch 83, or the closed condition of the contacts 82, is possible only when the document tray 11 is in the sheet feed position and there are sheets in the tray 11.

As the sheets in the documents tray 11 are sequentially fed out, the switch arms 86 and 87 gradually rotate clockwise until a position is reached at which the arm 85 has rotated counterclockwise sufficiently to engage with the switch arm 87. When this occurs, the arm 85 and shaft 81 will start to be rotated clockwise by the switch arm 87. There is therefore a point in which the arms 84 and 85 engage with the switch arms 86 and 87 respectively simultaneously.

As the last sheet in the tray 11 is fed out, the end portion 88a of the sensor arm 88 drops into the hole 11b as shown in FIG. 14 and the switch arm 87 is rotated sufficiently clockwise to rotate the arm 85 sufficiently clockwise to open the contacts 82 and again set the switch 83 to the first mode position. It will be noticed that in FIG. 12 the switch contacts 82 are held open by means of the arms 86 and 84 whereas in FIG. 14 the contacts 82 are held open by means of the arms 87 and 85.

The function of the mode switch 83 in an exemplary facsimile system will now be described with reference to FIGS. 16 to 20. It will be assumed that the mode switch 83 is ON when the contacts 82 are closed and OFF when the contacts 82 are open.

Figure 16:
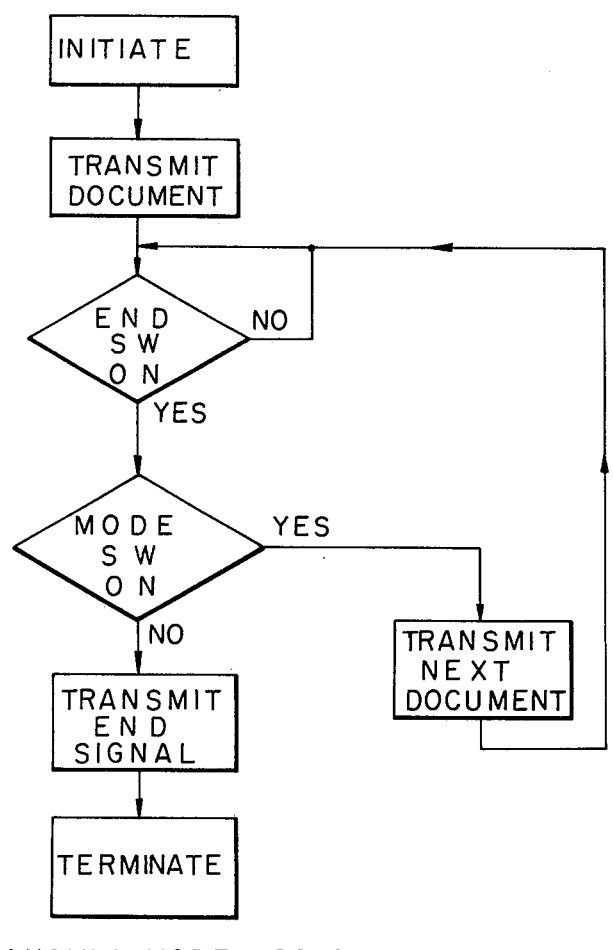
FIG. 16 is a flow chart illustrating the operation of the mode switch.

FIG. 16 shows the logic utilized by the facsimile system regarding the mode switch 83 and an end switch (not shown) which is closed or ON upon completion of transmission of a document.

With a facsimile transceiver which will be described below in the transmit mode, the mode switch 83 will be closed as long as there are documents in the document tray 11. Each time transmission of a document is terminated and the end switch is closed, the control section of the transceiver senses for simultaneous ON conditions of the mode switch 83 and the end switch. As long as there is one document in the tray 11, the mode switch SW will be ON and the transceiver will remain in the multiple transmission or continue mode and transmit the documents continuously. However, when the last document is loaded on the drum FD for transmission, the mode switch 83 goes OFF.

Figure 20:
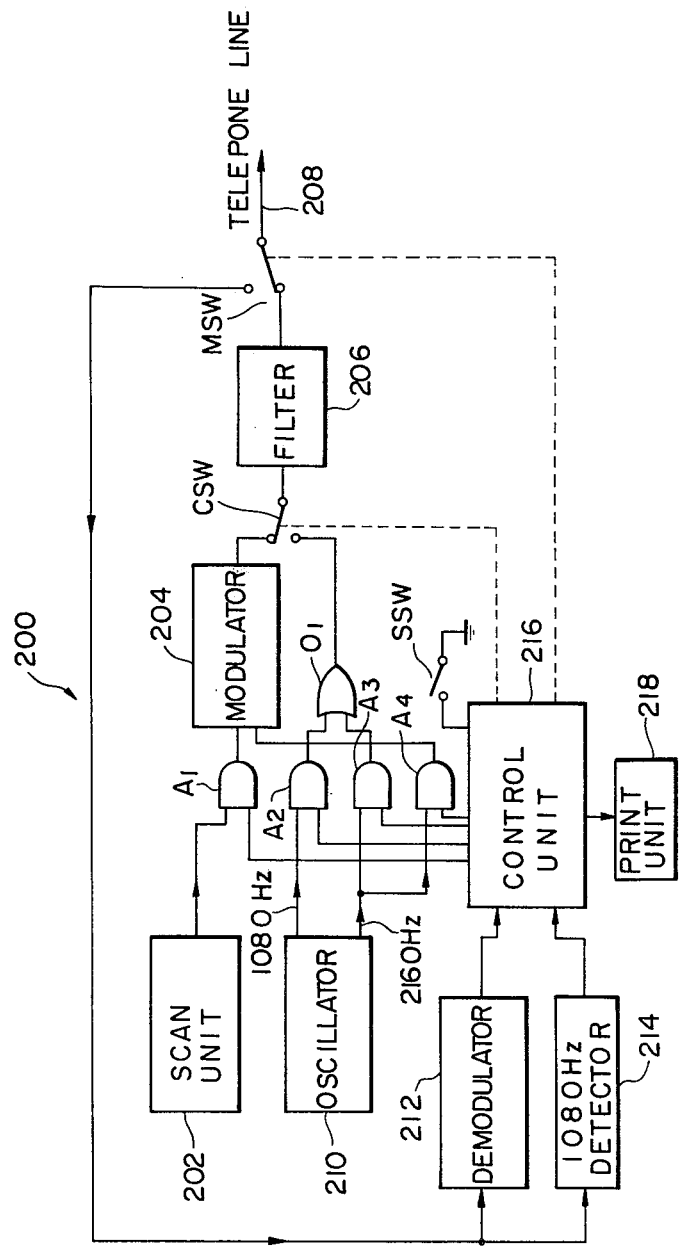
FIG. 20 is a block diagram of the exemplary facsimile transceiver.

FIG. 20 illustrates a typical facsimile transceiver 200 in which the sheet feed apparatus of the invention is advantageously incorporated. The transceiver 200 comprises a scan unit 202 operative to scan a document on the drum FD and feed electrical signals representing the document through an AND gate A1 to a modulator 204. The output of the modulator 204 is connected through a changeover switch CSW, a filter 206 and a mode changeover switch MSW to a telephone line 208. An oscillator 210 produces a sine wave at a frequency of 2160 Hz which is fed through AND gates A3 and A4 to an OR gate 01 and the modulator 204 respectively. This 2160 Hz signal is used by the modulator 204 as a carrier signal. The oscillator 210 comprises a frequency divider (not shown) which divides the 2160 Hz signal by a factor of two to produce a 1080 Hz signal which is applied through an AND gate A2 to the OR gate 01. The output of the OR gate 01 is connected to the changeover switch CSW.

The telephone line 208 is connected through the mode changeover switch MSW to inputs of the demodulator 212 and a 1080 Hz detector 214, the outputs of which are connected to a control unit 216. A start switch SSW is also connected to the control unit 216. The control unit 216 has an output connected to a print unit 218 comprising a stylus or the like to reproduce a transmitted document on a copy sheet.

The control unit 216 is connected to the AND gates A1 to A4 to selectively enable or inhibit the same, and also to the switches CSW and MSW to control the same.

To transmit a document over the telephone line 208, the control unit 216 enables only the AND gates A1 and A4 and controls the switchs CSW and MSW to connect the output of the modulator 204 to the telephone line 208 through the filter 206. The transceiver 200 is operative to transmit a 1080 Hz signal when the control unit 216 enables only the AND gate A2 and controls the switches CSW and MSW to connect the output of the OR gate 01 to the telephone line 208 through the filter 206.

The transceiver transmits a 2160 Hz signal when only the AND gate A3 is enabled and the output of the OR gate 01 is connected to the telephone line 208 through the filter 206.

The transceiver 200 acts as a receiver when the switch MSW is changed over the connect the telephone line 208 to the inputs of the demodulator 212. In this condition, the telephone line 208 is also connected to the input of the 1080 Hz detector 214, and the control unit 216 decides whether to perform a receive operation utilizing the print unit 218 or a supervisory function utilizing the 1080 Hz detector 214.

Figure 17:
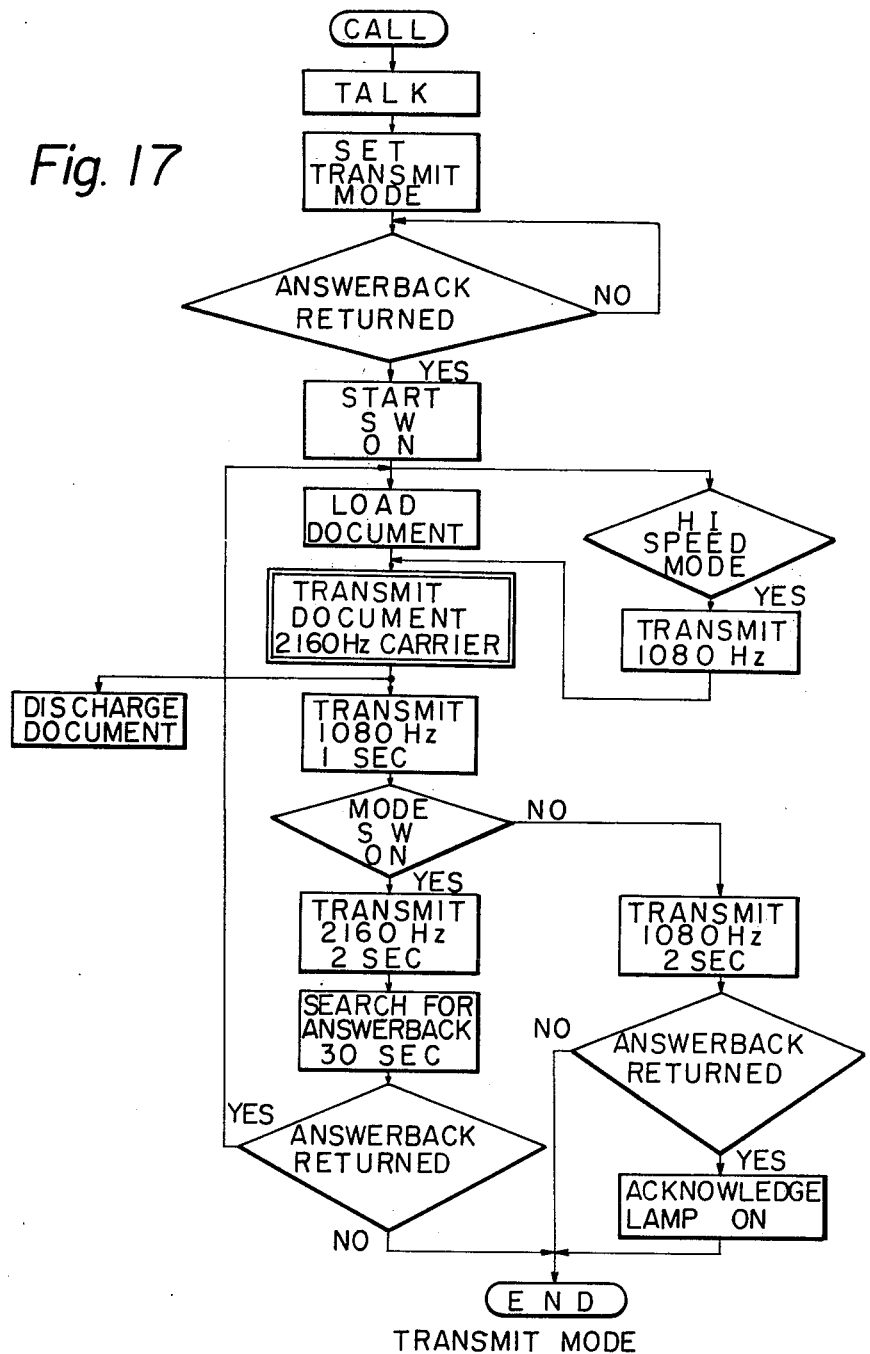
FIG. 17 is a flow chart illustrating the operation of an exemplary facsimile transceiver incorporating the sheet feed apparatus in a transmit mode.
Figure 18:
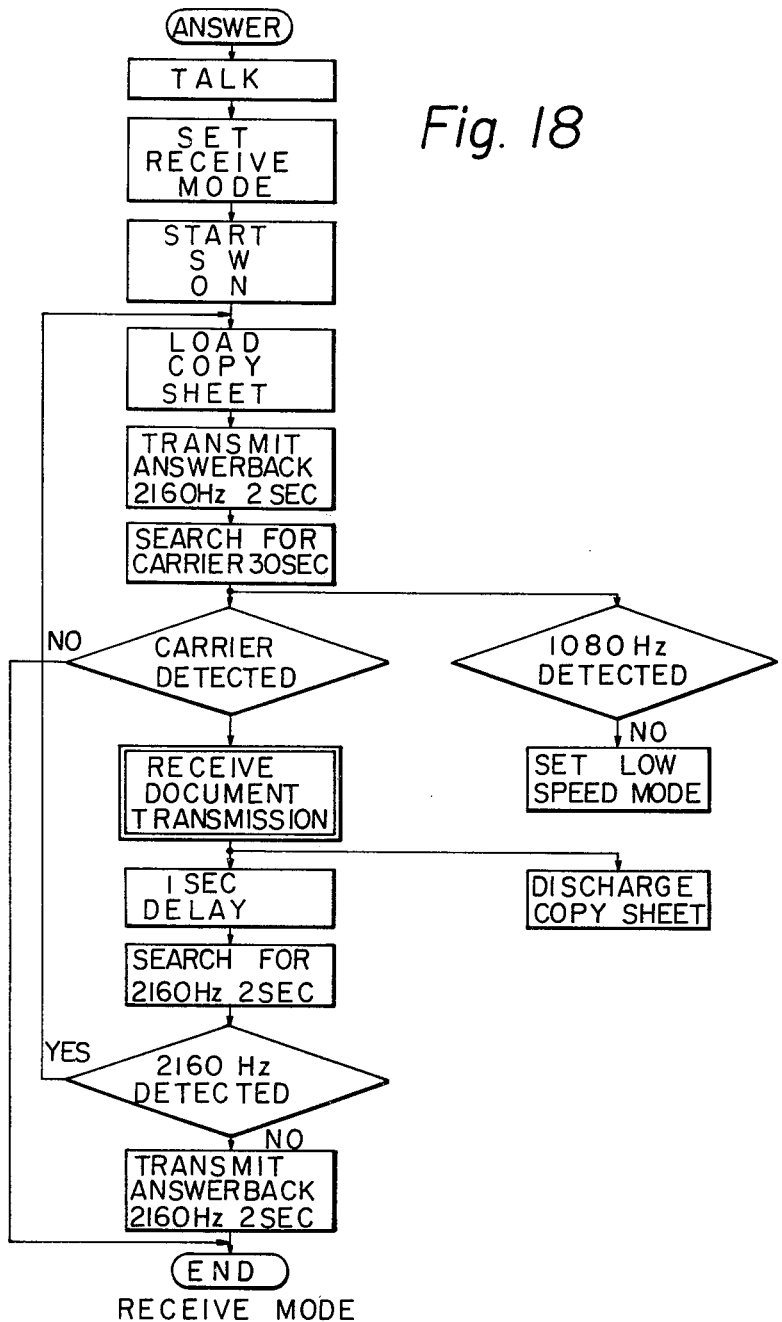
FIG. 18 is similar to FIG. 17 but illustrates the operation in a receive mode.
Figure 19:
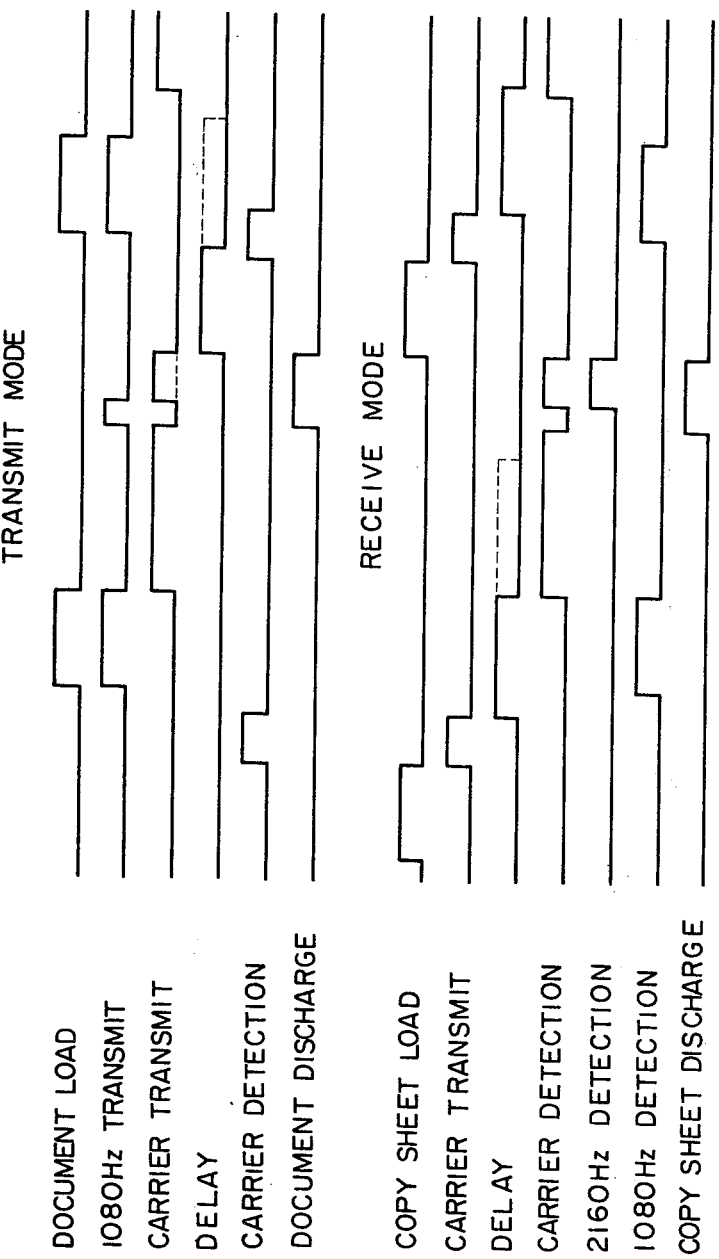
FIG. 19 is a time chart for the facsimile transceiver of FIGS. 16 and 17.

The operation of the transceiver 200 will now be described with simultaneous reference to the flow charts of FIGS. 17 and 18 and the time chart thereof of FIG. 19.

It will be assumed that two of the transceivers 200 are provided at remote locations for facsimile transmission therebetween. Both transceivers 200 are normally set to the receive mode, which enables unattended reception. However, in this exemplary case it will be assumed that both transceivers 200 are attended and that the operators have access to the telephone line 208. Since only one transceiver 200 is shown, reference numerals will generally not be utilized with reference to flow charts and a transmitting transceiver will be designated as the transmitter and a receiving transceiver will be designated as the receiver. FIG. 17 is a flow chart for the operation of the transmitter and FIG. 18 is a flow chart for the operation of the receiver.

As the first operation the transmitter operator calls the receiver operator and indicates that he has documents for transmission. The operators set their transceivers to the respective modes. For unattended operation the receiver may comprise means for automatically resetting the document tray 11 to the retracted position. The transmitter operator sets the transmitter to the transmit mode by moving the document tray 11 to the sheet feed position. This may be done either before making the call or after talking with the receiver operator.

The receiver operator presses his start switch SSW which causes a copy sheet to be automatically loaded onto the drum FD. Upon termination of loading the receiver transmits an answerback signal which consists of a two second transmission of the 2160 Hz signal to the transmitter. After transmitting the answerback signal, the receiver waits 30 seconds for the beginning of facsimile transmission utilizing the 2160 Hz carrier. If no transmission is received, the receiver breaks the telephone link.

In response to the answerback signal, the transmitter operator presses his start switch SSW which causes the first document to be loaded onto the drum FD.

If facsimile transmission is to be performed in a high speed mode, the transmitter transmits a 1080 Hz signal for a brief time, and the receiver in response to this signal sets itself to the high speed mode. If no 1080 Hz signal is transmitted, the normal or low speed mode is utilized. As soon as the document is loaded, the transmitter transmits the document to the receiver utilizing proper synchronizing signals which are not the subject matter of the invention and will not be described in detail. Upon termination of transmission, the transmitter discharges the document from the drum FD.

Also upon termination of transmission, the transmitter transmits a 1080 Hz signal for one second to overcome the effects of telephone line noise. The receiver renders itself inoperative for this same one second interval. The transmitter then senses the state of the mode switch 83 to determine if there are still any documents in the document tray 11. If the mode switch 83 is ON indicating that there is still at least one document in the document tray 11, the transmitter transmits a 2160 Hz signal for two seconds. If the mode switch SW is OFF indicating that the last document has been transmitted, the transmitter transmits a 1080 Hz signal. It is to be noted that since the 1080 Hz signal merely serves to overcome the effects of telephone line noise it is not absolutely necessary to transmit the 1080 Hz signal.

In response to 2160 Hz signal, the receiver loads another copy sheet onto the drum FD, transmits a 2160 Hz answerback signal for two seconds and waits 30 seconds for facsimile transmission from the transmitter. If transmission is received, the receiver repeats the receive operation described above. If no facsimile transmission is received within 30 seconds indicating some sort of malfunction, the receiver breaks the telephone link. The transmitter waits 30 seconds for the answerback signal from the receiver. If the answerback signal is received, the transmitter loads the next document on the drum FD and repeats the transmission operation described above. If the answerback signal is not received within 30 seconds indicating some sort of malfunction, the transmitter breaks the telephone link.

After the last document is transmitted and the mode switch 83 goes OFF, the transmitter transmits a 1080 Hz signal for 2 seconds rather than the 2160 Hz signal to avoid the telephone line noise. Since the receiver does not receive the 2160 Hz signal, it transmits a 2160 Hz answerback signal and goes off the line. The transmitter senses for the answerback signal and turns on an acknowledge lamp (not shown) in response thereto. Whether or not the answerback signal is received, the transmitter goes off the line.

Many modifications are possible for those skilled in the art within the scope of the invention after receiving the teachings of the present disclosure. For example, a system of photoelectric, electrostatic, capacitative, magnetic or ultrasonic sensors may replace the mechanism shown in FIG. 11. As an added feature, it will be understood that the guide arms 18 cause the rear end of the document tray 11 to rock upwardly about the tabs 11c to facilitate easy insertion of copy sheets into the copy sheet tray 12.

What is claimed is:

1. A sheet feed apparatus for feeding sheets to a business machine comprising:
   a first sheet tray;
   a second sheet tray slidable on the first sheet tray between a retracted position and a sheet feed position;
   a sheet feed means;
   actuator means for producing relative movement of the sheet feed means and the first and second sheet trays toward and away from each other in such a manner that the sheet feed means when moved toward the first and second sheet trays is engagable with the first sheet tray to feed sheets therefrom when the second sheet tray is in the retracted position and engagable with the second sheet tray to feed sheets therefrom when the second tray is in the sheet feed position;
   mode switch means having a first mode position and a second mode position, said mode switch means when in said first mode position conditioning said business machine to operate in one mode and when in said second mode position conditioning said business machine to operate in another mode; and
   sensor means operable to actuate said mode switch means between its first and second mode positions, said sensor means being actuated in response to the sliding movement of the second sheet tray such that when the second sheet tray is in the retracted position, the sensor means actuates the mode switch means to the first mode position as said sheet feed means feeds sheets from said first sheet tray to said business machine, and when the second sheet tray is in the sheet feed position the sensor means actuates the mode switch means to the second mode position as said sheet feed means feeds sheets from said second sheet tray, said sensor means being operable to sense the presence of a sheet in the second sheet tray and to actuate the mode switch means to the second mode position only in response to the presence of a sheet in the second sheet tray.

2. A sheet feed apparatus as in claim 1, in which the second sheet tray is formed with a hole and the sensor means comprises a sensor arm urged to protrude into the hole in absence of a sheet in the second sheet tray and linkage means connecting the sensor arm to the mode switch means.

3. A sheet feed apparatus as in claim 2, in which the mode switch means comprises a mode switch having a first actuator member, the linkage means comprising a shaft which supports the sensor arm for simultaneous rotation and a first switch arm supported by the shaft for simultaneous rotation and being engagable with the first actuator member of the mode switch.

4. A sheet feed apparatus as in claim 3, in which the first actuator member is rotatable to actuate the mode switch, the linkage means further comprising a second switch arm supported by the shaft for simultaneous rotation and being engagable with a second actuator member of the mode switch which is rotatable to actuate the mode switch, the first and second switch arms being angularly spaced from each other.

5. A sheet feed apparatus as in claim 4 in which the first and second actuator members are engagable with first and second edges of the first and second switch arms respectively which angularly face each other.

6. A sheet feed apparatus as in claim 5, in which the linkage means further comprises biasing means urging the first and second actuator members toward engagement with the first and second switch arms respectively.

7. A sheet feed apparatus as in claim 6, in which the mode switch along with its first and second actuator members are located in a position relative to the linkage means and its first and second switch arms such that
   when the second sheet tray is in the retracted position the first actuator member engages with the first switch arm and the second actuator member is spaced from the second switch arm;
   when the second sheet tray is in the sheet feed position and there is an absence of sheets in the second sheet tray the first actuator member is spaced from the first switch arm and the second actuator member engages with the second switch arm; and
   when the second sheet tray is in the sheet feed position and a sheet is present in the second sheet tray the first actuator member is engagable with the first switch arm.

8. A sheet feed apparatus as in claim 3, in which the linkage means further comprises a retractor arm fixed to the shaft for unitary rotation and a latch member biased to hold the retractor arm and thereby the sensor arm in a position in which the sensor arm is spaced from the second sheet tray when the second sheet tray is in the retracted position, the second sheet tray being arranged to move the latch member to release the retractor arm and thereby the sensor arm for engagement with the second sheet tray when the second sheet tray is in the sheet feed position.

9. A sheet feed apparatus as in claim 8, in which the linkage means further comprises a link movable by the second sheet tray to actuatingly engage with the latch member.

10. A sheet feed apparatus as in claim 9, further comprising biasing means urging the link away from the latch member.

11. A sheet feed apparatus for a facsimile transceiver comprising:
   recording sheet holding means for accommodating thereon recording sheets;
   transmission document holding means for accommodating thereon transmission documents, said transmission document holding means being movable between a retracted position and a sheet feed position;
   control means actuated in response to the movement of the transmission document holding means to the sheet feed position;
   transmission document detecting means for detecting the presence of transmission documents in the transmission document holding means when the latter is located in the sheet feed position; and
   a multiple select switch for automatically setting the facsimile transceiver to a receive mode when the transmission document holding means is in the retracted position and to a transmit mode in response to the actuation of the control means upon movement of the transmission document holding means to the sheet feed position, said multiple select switch continuously setting the facsimile transceiver to the transmit mode until the non-existence of transmission documents in the transmission document holding means is detected by the transmission document detecting means.

12. A sheet feed apparatus as in claim 1 wherein said business machine is a facsimile transceiver which is conditioned by said mode switch means to transmit and receive modes.

13. A sheet feed apparatus as in claim 1 wherein said business machine is a copying machine which is conditioned by said mode switch means to receive different size copy sheets.

* * * * *